A. WOLFRAM.
MACHINE FOR MAKING NUTS.
APPLICATION FILED MAY 28, 1920.

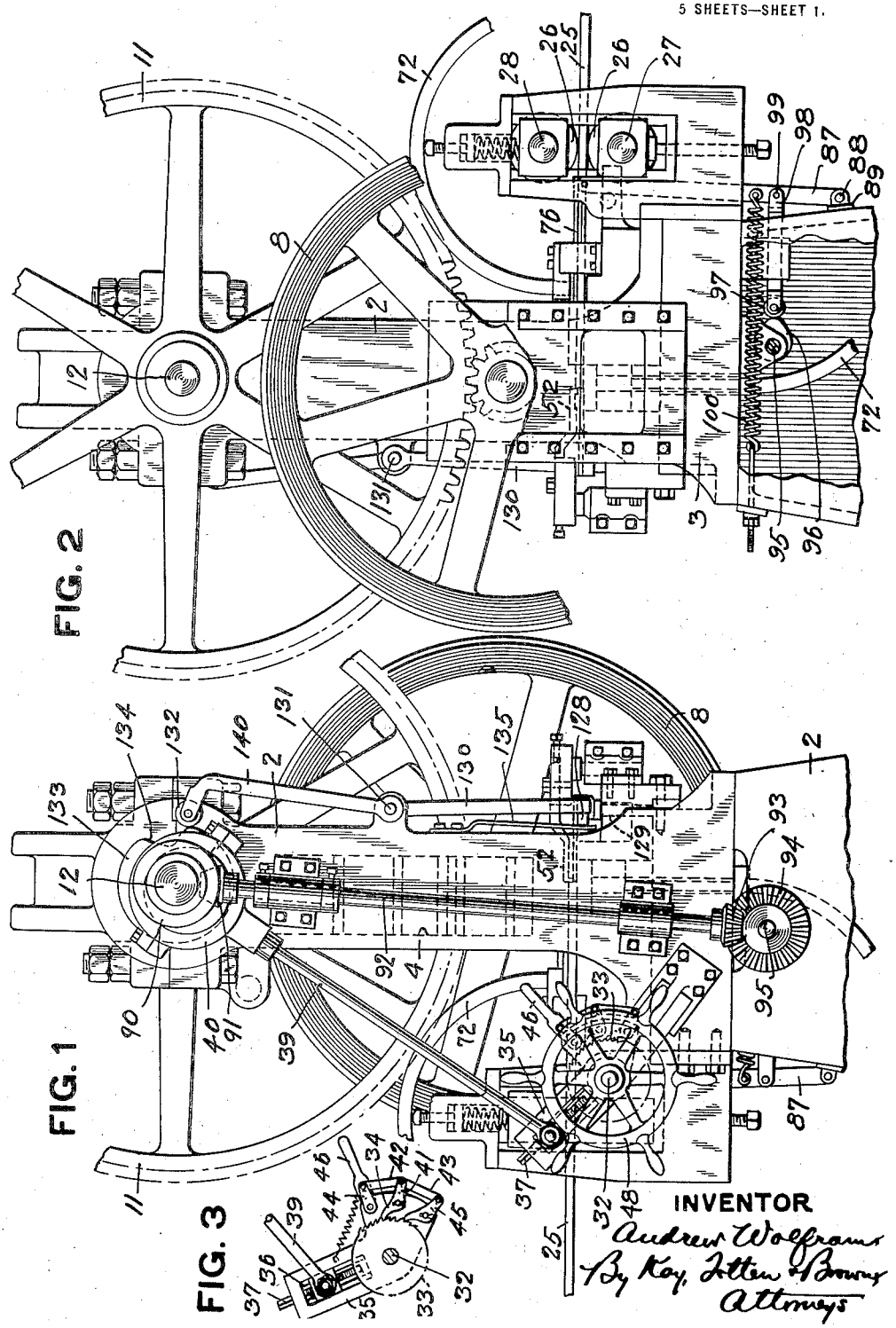

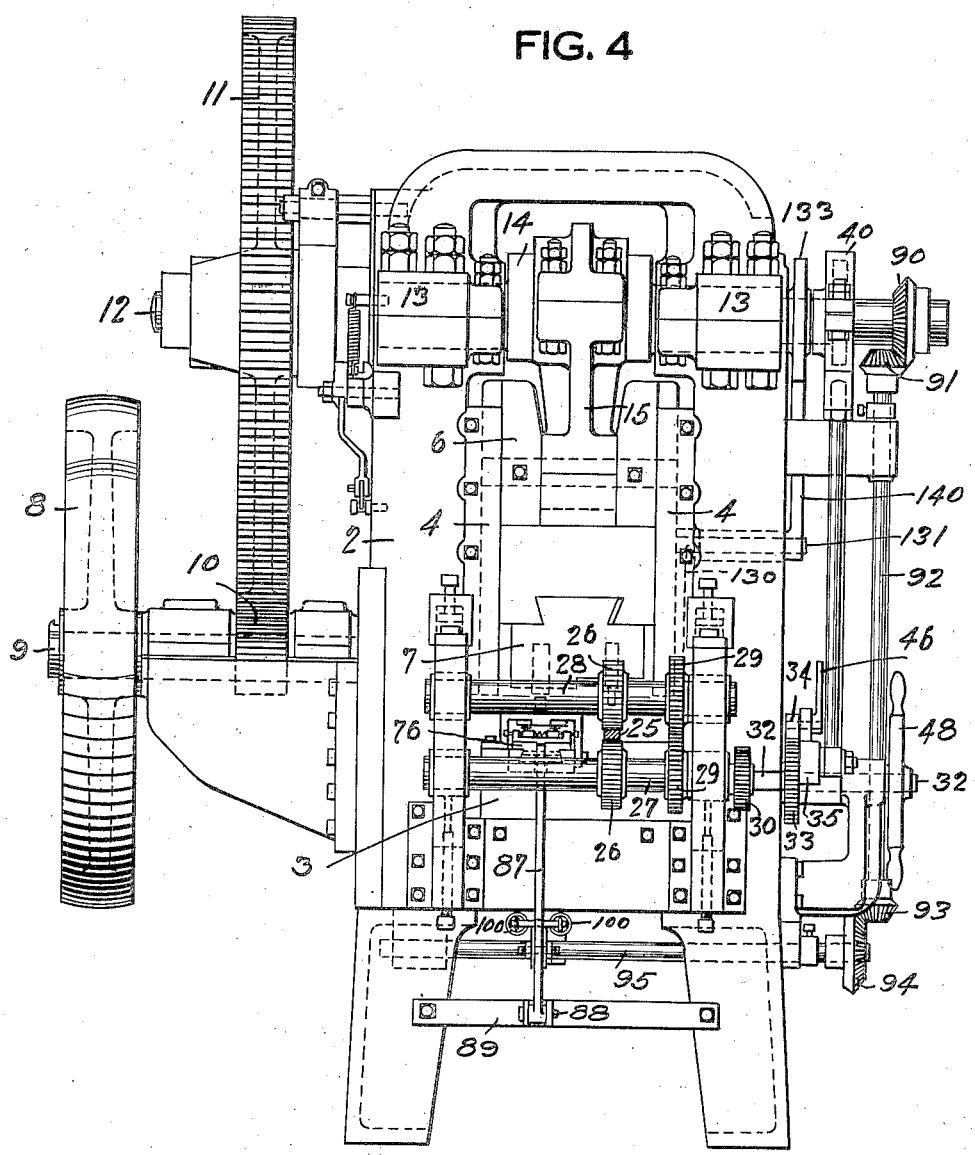

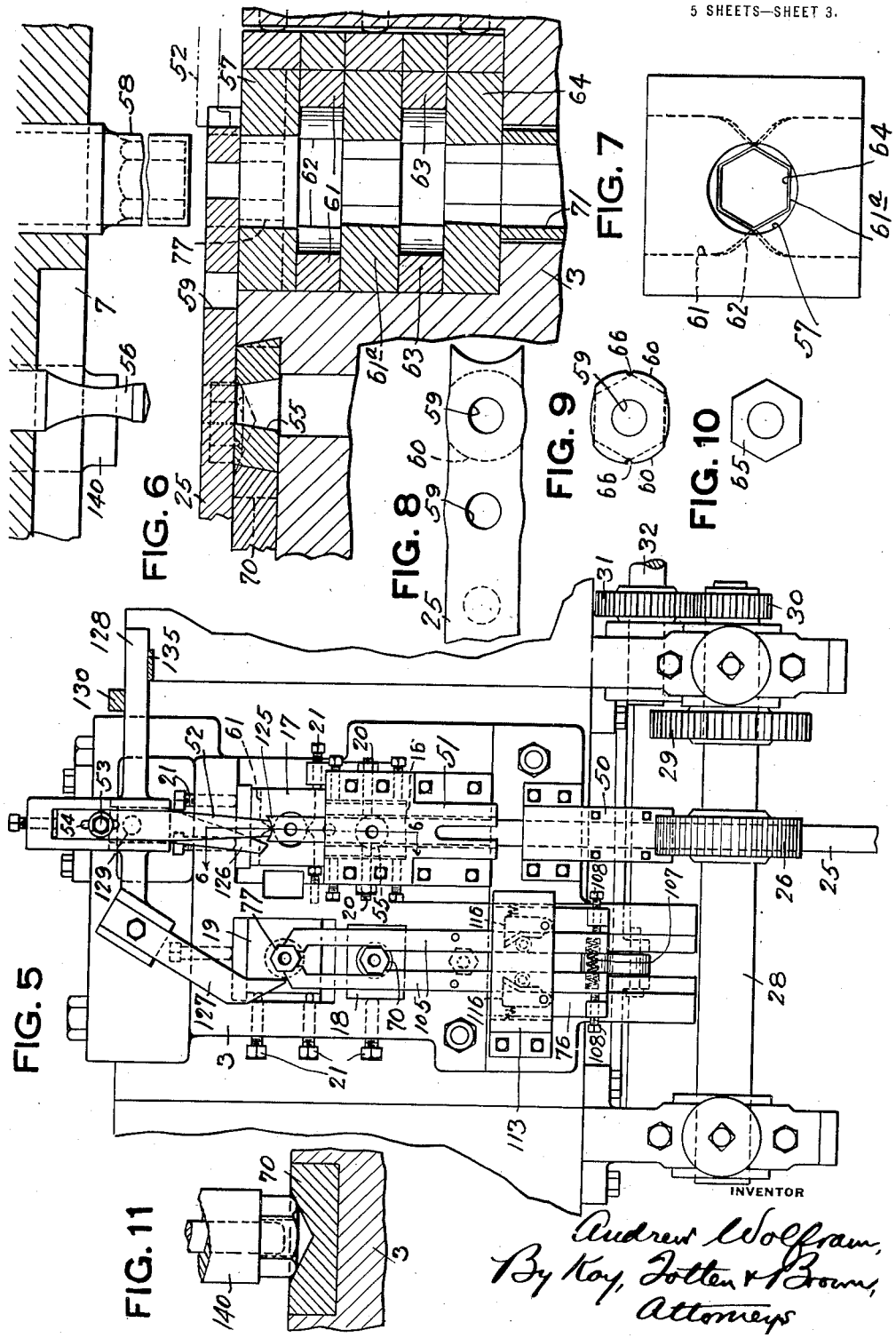

1,393,063.

Patented Oct. 11, 1921.
5 SHEETS—SHEET 4.

A. WOLFRAM.
MACHINE FOR MAKING NUTS.
APPLICATION FILED MAY 28, 1920.
1,393,063.
Patented Oct. 11, 1921.
5 SHEETS—SHEET 5.
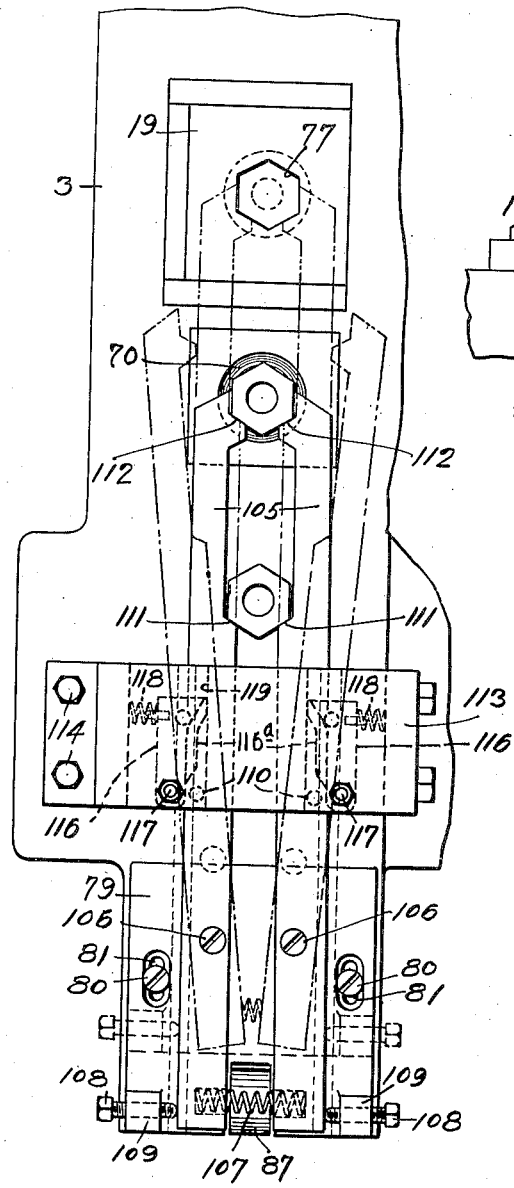
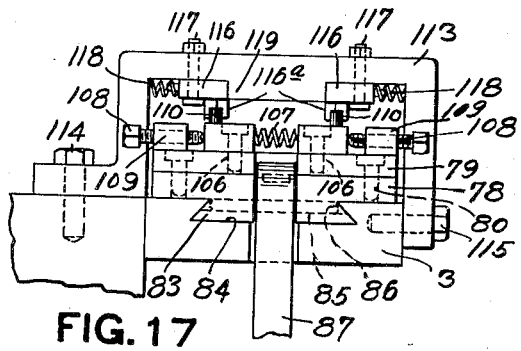
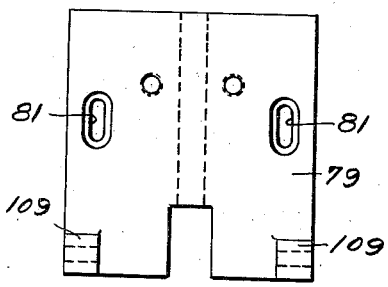
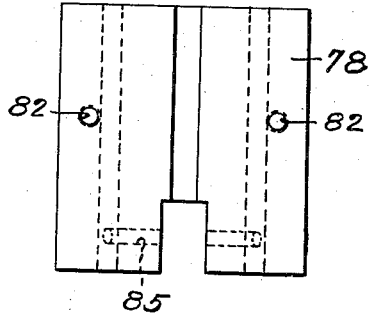
INVENTOR
Andrew Wolfram,
By Kay, Totten & Brown,
Attorneys

UNITED STATES PATENT OFFICE.

ANDREW WOLFRAM, OF DORMONT, PENNSYLVANIA.

MACHINE FOR MAKING NUTS.

1,393,063.   Specification of Letters Patent.   Patented Oct. 11, 1921.

Application filed May 28, 1920. Serial No. 385,003.

*To all whom it may concern:*

Be it known that I, ANDREW WOLFRAM, a citizen of the United States, and resident of Dormont, in the county of Allegheny and State of Pennsylvania, have invented a new and useful Improvement in Machines for Making Nuts; and I do hereby declare the following to be a full, clear, and exact description thereof.

My invention relates to machines for making nuts, and it has for its object to provide a machine which shall operate rapidly and automatically to perform all the operations necessary to produce finished nut blanks from cold stock, including the operations of piercing, cutting, trimming, crowning and finishing.

My machine consists, in general, of a bed carried by a suitable frame and supporting a series of dies, four separate sets of dies being shown in the machine described below, together with a punch-head reciprocating toward and from the bed and carrying a series of punches coöperating with the several dies. In addition, my machine comprises novel means for automatically moving the blanks successively into position to be acted upon by the several dies which shape and finish the nuts.

Figure 12:
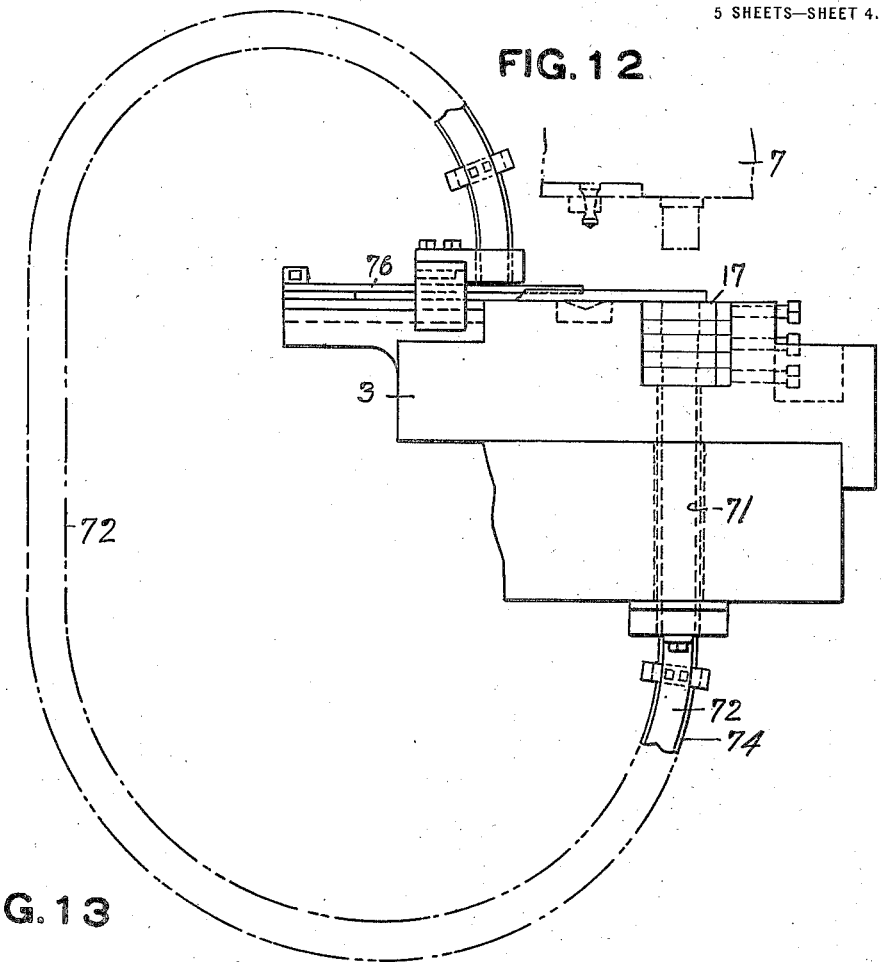
Figure 13:
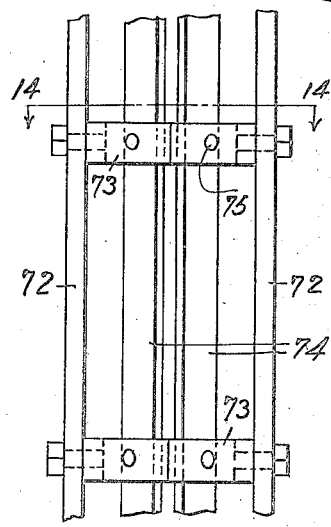
Figure 14:
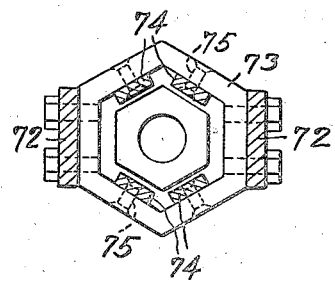

In the accompanying drawings, Figure 1 is a side elevational view, with parts broken away, of a machine constructed in accordance with my invention; Fig. 2 is a side elevational view taken from the opposite side of the same machine; Fig. 3 is a side elevational detail view showing the feed-roller control mechanism; Fig. 4 is a front elevational view of the machine; Fig. 5 is a plan view of the bed of the machine showing the several sets of dies, the work-feeding mechanism, and a portion of the work-transferring mechanism. Fig. 6 is a vertical sectional view taken longitudinally and centrally through the first and second sets of dies and punches, the section being taken substantially along the line 6—6, Fig. 5. Fig. 7 is a plan view of the set of dies shown at the right of Fig. 6; Fig. 8 is a plan view of a strip of material to be made into nuts, showing the first operations performed on the bar; Fig. 9 is a plan view of a blank as it appears during the rough punching operation; Fig. 10 is a similar view of a nut blank as it leaves the lower or trimming die shown in Fig. 6; Fig. 11 is a fragmentary side view, partly in elevation and partly in section, showing the nut blank of Fig. 10 being operated upon by the crowning die and punch. Fig. 12 is a diagrammatic side view showing the relation between the roughing and trimming dies and the crowning die, and showing particularly the chute by which nut blanks are conveyed from below the trimming die into position upon the crowning die. Fig. 13 is a side view of a portion of the chute shown in Fig. 11; Fig. 14 is a cross sectional view of the same chute, the section being taken substantially on the line 14—14, Fig. 13; Fig. 15 is a plan view of the slide which conveys the blanks to the crowning die and to the finishing die; Fig. 16 is an end elevational view of the construction shown in Fig. 15; Fig. 17 is a plan view of the upper slide plate shown in Figs. 15 and 16; and Fig. 18 is a plan view of the lower slide plate shown in Figs. 15 and 16.

The machine shown in the drawings comprises a suitable frame 2 upon which is carried a bed 3 and vertical guides 4 within which reciprocates a cross-head 6 carrying a punch block 7. The block 7 is provided with a series of punches which coöperate with dies carried in the bed 3, as will more fully appear below. Power for reciprocating the cross-head 6 is taken from a pulley 8 mounted on a shaft 9 which also carries a pinion 10 meshing with a large gear wheel 11, which is mounted on a crank shaft 12 that extends completely across the machine and is journaled in bearings 13. Between the bearings 13, the shaft 12 is provided with a crank 14 connected to the cross-head 6 by means of a connecting rod 15.

As best shown on Fig. 5, the bed 3 carries four die blocks 16, 17, 18 and 19, the block 16 carrying the piercing die, the block 17 carrying a superposed series of punching, scoring and finishing dies, the block 18 carrying a crowning die and the block 19 carrying a finishing die. The die blocks are secured in the bed by any usual or convenient means, such as the adjusting bolts 20 and set screws 21, shown in Fig. 5.

The detailed construction and operation of the several mechanisms composing the machine will best be understood by following a nut blank through the several operations. The stock is fed to the machine in the form of a strip 25 which is advanced intermittently by means of two knurled or corrugated feed rollers 26, as shown in Figs. 2, 3 and 4. The feed rollers 26 are given an intermittent feeding movement by mechanism shown in Figs. 1 and 3. The lower feed roller is carried by a shaft 27 and the upper feed roller is carried by shaft 28, the shafts 27 and 28 being connected to rotate in unison by means of meshing gear wheels 29. The lower shaft 27 also carries a pinion 30 which meshes with a pinion 31 on a shaft 32 that also carries a ratchet 33 which is fixed to the shaft. A driving pawl 34 cooperates with the ratchet 33 to drive the shaft 32 and is carried on an L-shaped rocking plate 35 that is loosely mounted on the shaft 32. The plate 35 is provided with a slot 36 within which is a screw 37 that is in screw-threaded engagement with a block 37ª that is pivotally connected to the lower end of a pitman rod 39 which connects the rocking plate 35 to an eccentric 40 mounted on the main crank shaft 12. As the shaft 12 rotates, the pitman 39 is reciprocated by means of the eccentric 40 and rocks the plate 35 through an arc which is determined by the position of the lower end of the pitman upon the screw 37. The rocking movement of the plate 35 is transmitted to the shaft 32 through the pawl 34 and the ratchet disk 33, and the feed rollers 26 are thus rotated intermittently to feed the stock into the machine.

In order to throw the pawl 34 out of engagement with the ratchet disk 33 to stop the feed or to permit adjustment, the pawl is provided with an extension 41 which is connected by means of links 42 and 43 to levers 44 and 45 that are pivotally secured to the plate 35. The link 43 is extended to form an additional pawl engaging ratchet disk 33. The lever 44 is provided with a handle 46. When the handle 46 is depressed, the pawl 34 is raised from the ratchet disk 33 and is held in this position by means of a spring 47. When the pawl is thus disengaged from the ratchet disk, the shaft 32 may be turned in either direction by means of a hand wheel 48.

As the stock enters the machine, it passes first through feed rolls, a slotted guide plate 50, and next through a similar guide plate 51, which also serves as a stripper plate for the piercing die 55 carried by the block 16. The forward movement of the stock is limited by means of a fixed stop 52 which, as shown in Fig. 5, is bolted to the bed 3 and is arranged for a small amount of lengthwise adjustment by means of a bolt 53 and a slot 54 to provide for making nuts of various sizes.

When the stock is moved up against the stop 52 and the punch head descends, the stock is pierced and punched in the manner best shown in Figs. 5 and 7, where the piercing die is shown at 55 directly beneath the piercing punch 56, and the first cutting die 57 directly beneath the cutting punch 58. The piercing punch punches a circular hole 59 in the stock and at the same time the roughing punch cuts out from the strip a section of the shape shown in Fig. 7 with rounded ends 60 indicated in dotted lines and sides that are flat, or nearly so.

Disposed beneath the roughing die 57 is a scoring die or scrap stock breaker 61 which is composed of two opposite chisel-like points 62, as shown in Fig. 6, which serves to score the rounded ends of the blanks so that when the blank is forced down through the roughing die and shaped into hexagonal form, the scraps of metal will divide along the lines scored by the stock breaker and will pass out of the way without interfering with the operation of the dies. Fig. 9 shows the blank as it is being acted upon by the first stock breaker 61 the score marks made by the stock breaker being indicated at 66.

Below the first stock breaker 61 is a roughing die 62 which gives the blank a hexagonal shape and below the roughing die 62 is a second stock breaker 63 which scores the sides of the blank in the same manner and for the same purpose as the first stock breaker 61. Immediately below the second stock breaker 63 is a trimming die 64 which gives the nut blank its correct size and shape, as shown at 65, Fig. 10.

The nut blanks are forced downward through the several dies and stock breakers shown in Fig. 5 by the impact of the cutting die 58, each blank being forced into the next position by the pressure of the blank which follows it.

The same impulses delivered by the die 58 are utilized to transfer the partly finished nuts from the trimming die 64 to the crowning die 70. The crowning die 70 is located on the surface of the bed 3 opposite to the punching die 55 and in order to convey the nuts from the trimming die to the crowning die, I provide a hexagonal transfer chute, the construction and arrangement of which will best be seen by reference to Figs. 11, 12 and 13. Immediately below the trimming die 64 is a tubular passageway 71 of hexagonal cross section which communicates at its lower end with the transfer chute. This chute is made up of two parallel bars 72 to which are bolted a series of spaced hexagonal collars 73, to the inner sides of which four guide strips 74 are attached by means of screws 75. The strips 74 form a guideway for the nuts 65 which force each other through the chute, which guide the nuts to their next position upon the bed, where the last nut in the chute rests upon the feeding arms of a slide 76 in the relation shown in Fig. 2.

The slide 76 serves to take the nuts from the chute 72 and delivers them successively to the crowning die 70 and the finishing die 77. The construction of this slide may best be seen in Figs. 4, 5 and 15 to 18. As therein shown, the slide consists of a lower plate 78 and an upper plate 79 resting upon the lower plate and adjustably secured thereto by means of screws 80 extending through slots 81 in the plate 79, and into screw-threaded holes 82 in the plate 78. The plate 78 is provided with a dove-tailed portion 83 which is received within a groove 84 in the bed 3 and is also provided with a transverse opening 85 to receive a pin 86 by means of which the slide 76 is pivotally secured to the upper end of a rocking lever 87 which is pivoted at 88 to a bar 89 carried by the frame 2, as shown in Fig. 3. The lever 87 is reciprocated by means of power taken from the main crank shaft 12 through connections shown in Figs. 1, 2 and 3. The crank shaft carries a bevel gear wheel 90 meshing with a bevel pinion 91 carried at the upper end of an upright shaft 92, the lower end of which carries a bevel pinion 93 meshing with a bevel gear wheel 94 secured to the end of a horizontal shaft 95 which also carries a cam 96. A roller 97 bears upon the cam 96, as shown in Fig. 2, and is carried at the inner end of a reciprocating arm 98 which is pivotally attached at 99 to the rocking lever 87. Springs 100 are attached to the frame and to the lever 87 and coöperate with the cam 96 to reciprocate the lever 87.

The upper plate 79 of the slide 76 carries a pair of gripping arms 105 which are shown in Figs. 4, 14 and 15. The arms 105 are secured to the plate 79 by means of screws 106 and are normally held in their parallel or gripping position by means of a compression spring 107 which is received in recesses near the ends of the arms 105. The exact position taken by the arms 105 under the influence of the spring 107 is determined by means of set screws 108 which extend through lugs 109 that project upwardly from the corners of the plate 79. Each of the arms 105 is provided with an upwardly extending cam pin 110 and with two work-holding shoulders 111 and 112, respectively, which coöperate to grip and move the nuts from the chute 72 to the crowning die 70 and later to the finishing die 77.

A yoke 113 extends over the slide described above, and is secured to the bed 3 by means of bolts 114 and 115. Two plates 116 carrying cam members 116ª are secured to the under side of the yoke 113 by means of bolts 117, and these cam plates are pivotally movable around the bolts 117, being normally pressed by means of springs 118 against the sides of a downwardly extending shoulder 119 formed on the under side of the yoke 113.

The arms 105 are shown in full lines on Fig. 15 in the position in which the shoulders 111 are holding a nut 65 immediately beneath the discharge end of the chute 72 and in which the forward shoulders 112 are gripping a nut on the crowning die 70. As the slide moves forward, the arms 105 remain in the relative position shown in full lines, and move the two nuts into position upon the crowning die 70 and the finishing die 77, respectively. During its forward movement, the cam pins 110 on the gripping arms engage the cam members 116ª, but push them to one side against the pressure of the springs 118. When the cam pins 110 pass beyond the cam members 116ª, the cam members are again moved out into the path of the pins 110 by means of the springs 118, and when the slide is retracted, the cam members will deflect the pins 110, bringing the arms 105 into the diverging position shown in dotted lines on Fig. 15. The gripper arms remain in this position until the pins 110 pass beyond the lower ends of the cam members 116ª, and during this time the next nut from the chute 72, which has been resting upon the arms 105, falls between these arms and into position to be grasped between the shoulders 111 when the arms again approach each other, which occurs under the influence of the spring 107 when the pins 110 are released from the cam members 116ª.

When the blank is originally cut off from the bar 25 by the cutting punch 58, a small piece of metal is left on the bed, as shown at 125, Fig. 5. Also, when the nut passes through the finishing die 77, a small amount of waste metal is left on the die block. To get rid of these waste pieces of metal I provide two wiping fingers 126 and 127 which are secured to an arm 128 that is pivotally attached to the frame of the machine at 129, and is given a quick reciprocation after each stroke of the punch-head by means of a lever 130 shown in Figs. 1 and 5. The lever 130 is secured to a rod 131, to which is also attached a lever arm 140 that carries at its upper end a cam roller 132 which travels upon the periphery of a circular cam 133 secured to the main crank shaft 12. The cam 133 has a short depression 134. As the crank shaft 12 rotates, the roller 132 rides upon the concentric portion of the cam, and the lower end of the lever 130 is thus caused to press against the arm 128 and hold the fingers 126 and 127 in the position shown in Fig. 4. When the cam 133 rotates to bring the depression 134 opposite to the roller 132, the roller will enter the depression and the arm 128 will be moved outwardly under the influence of a leaf spring 135 which is secured to the frame of the machine, and presses against the inner side of the arm 128, as shown in Figs. 1 and 4. This movement of the arm 128 caused by the spring 135 and the cam 133 moves the fingers 126 and 127 quickly back and forth across the die blocks 17 and 19 and thus removes the pieces and chips of metal that are left on the die blocks.

In the operation of the machine which I have shown and described, the vertical reciprocation of the punch-head and the rotation of the crank shaft 12 are utilized to operate the several mechanisms in timed relation. The strip of cold metal entering the machine between the feed rollers 26 is first pierced by the piercing punch 56 and the pierced end of the bar is then moved forward against the stop 52 where it rests above the superposed set of shaping dies. The rough blank is then cut off by the cutting punch 58. The blank then travels downward through the cutting die 57, the first stock breaker 61, the hexagonal roughing die 62, the second stock breaker 63 and the hexagonal trimming die 64 into the tubular passage 71, from the lower end of which it enters the chute 72 and is pushed by the blanks which follow it up and across the machine and upon the arms 105 of the feeding slide 76. It is then grasped by the shoulders 111 on the arms 105 and at the next forward movement of the slide is deposited upon the crowning die 70, where it is acted upon by the crowning punch 140 to produce the rounded crown. While the punch head is descending, the feed slide is moved backward, its arms being moved outward as described above, and then being allowed to come together to grip the nut which is on the crowning die between the shoulders 112 and also to grip the next nut from the chute 72 between the shoulders 111. On the next forward movement of the slide, the nut from the crowning die 70 is moved forward to the finishing die 77 and is forced through the finishing die by the fourth and last punch which operates upon it. The finishing die restores the shape of the nut which has been somewhat distorted in the crowning operation, and the completed nuts, ready for threading, fall through the finishing die into a suitable receptacle.

By properly selecting the dies and punches, the machine may obviously be used for making nuts of various sizes and shapes.

It will be observed that I have provided a machine which operates in an entirely automatic manner to make finished nuts from cold strip material, a result which I believe to be new. I have shown and described herein a machine which is well adapted to carry out my invention, but it is to be understood that various changes in the form and arrangement of parts may be made without departing from the scope of my invention. I therefore desire that no limitations be imposed upon my invention except such as are indicated in the appended claims.

What I claim is:

1. A machine for making nuts comprising a plurality of dies, means for forcing a nut blank vertically through one of the said dies and for automatically transferring the said blanks from the said die to another of said dies, the latter die being laterally displaced from said first die, and means for forcing the said blanks vertically through the said second die.

2. A machine for making nuts comprising a bed, a plurality of vertically reciprocable dies disposed side by side on said bed, a punch coöperating with one of the said dies, and means for utilizing the force applied by the said punch to transfer blanks from the said die to another die laterally displaced from said first die, and means for forcing the said blanks vertically through the said second die.

3. A machine for making nuts comprising a frame, a horizontal bed supported in the said frame, a plurality of dies carried by the said bed, a punch head vertically reciprocable toward and from the said bed, a punch carried by the said punch head and adapted to coöperate with one of the said dies, and means for utilizing the force applied by the said punch to transfer blanks from the said die to another die on said bed and laterally displaced from said first die.

4. A machine for making nuts comprising a piercing die, means for intermittently feeding strip material into position to be pierced by the said die, a series of superposed cutting, roughing and trimming dies, scoring means associated with the said superposed dies and punches adapted to coöperate with the said piercing die and with the said cutting die.

5. A machine for making nuts comprising a piercing die, means for intermittently feeding strip material into position to be pierced by the said die, a cutting die, roughing die and trimming die disposed one below the other, scoring means interposed between the said cutting and roughing dies and between the said roughing and trimming dies, and punches adapted to coöperate with the said piercing die and with the said cutting die.

6. A machine for making nuts comprising a piercing die, means for intermittently feeding strip material into position to be pierced by the said die, a cutting die disposed beyond the said piercing die, roughing and trimming dies disposed below the said cutting die, scoring means interposed between the said cutting and roughing dies and between the said roughing and trimming dies, a crowning die, means for transferring blanks from the said trimming die to the said crowning die, a finishing die, means for transferring blanks from the said crowning die to the said finishing die, and punches coöperating with the said piercing, trimming, crowning and finishing dies.

7. A machine for making nuts comprising a set of dies and punches, and means for feeding strip material to the said dies and punches, the said feeding means comprising two parallel shafts, gears for connecting said shafts to move in unison, a gear wheel secured to one of the said shafts, a driving gear meshing with said gear wheel, and means for intermittently rotating the said driving gear.

8. A machine for making nuts comprising a frame, a bed carried by the said frame, a plurality of dies disposed on said bed, a vertically reciprocable punch head carrying punches adapted to coöperate with the said dies, a crank shaft for reciprocating said punch head, feed rollers for intermittently feeding strip material to certain of the said punches and dies, and means for intermittently rotating the said feed rollers comprising a power shaft, a ratchet disk secured thereto, a pawl adapted to drive the said ratchet disk, a member carrying said pawl and adapted to oscillate upon the said power shaft, an eccentric carried by the said crank shaft, and adjustable connections between the said eccentric and the said rocking member.

9. A machine for making nuts comprising a plurality of dies disposed one above the other, and a single punch for forcing blanks through all of the said dies, and means for removing the waste stock from said blanks during their passage through said set of dies.

10. A machine for making nuts comprising a plurality of dies disposed one above the other, scoring means disposed between the said dies, and a single punch for forcing blanks through all of the said dies and past the said scoring means.

11. A machine for making nuts comprising a bed, a plurality of dies carried by said bed and disposed one above the other, a single vertically moving punch for forcing blanks through all of the said dies, an additional die on said bed and laterally displaced from the first-mentioned dies, and means for utilizing the force applied by the said punch for transferring blanks from the said set of superposed dies to the said additional die.

12. A machine for making nuts comprising a bed, a cutting die disposed on said bed, roughing and trimming dies associated with said roughing die, a punch for forcing blanks through all of the said dies, a crowning die also on said bed and displaced from the first-mentioned dies, and means for utilizing the force applied by the said punch for transferring blanks from the said die to the said crowning die, the said transferring means comprising a chute conforming to the shape of the blanks so transferred.

13. A machine for making nuts comprising a bed, cutting, roughing and trimming dies disposed, one above the other in said bed, a single vertically moving punch for forcing blanks through all of the said dies, crowning and finishing dies on said bed displaced from the first mentioned dies, means for utilizing the force applied by the said punch for transferring blanks from the said set of superposed dies to the said crowning die, and means for transferring the blanks from the said crowning die to the said finishing die.

14. A machine for making nuts comprising a plurality of dies, and means for moving blanks to one of the said dies and for thence transferring the said blanks to another die, the said moving and transferring means comprising a slide, a pair of work-engaging arms carried by the said slide, each of said arms having a plurality of work-engaging means, means for causing the said arms to alternately engage and release the said blanks, and means for reciprocating the said slide.

15. A machine for making nuts comprising a plurality of dies, means for transferring blanks from one of said dies to another, the said transferring means comprising a slide, a pair of work-engaging arms carried by the said slide, means for normally holding the said arms in work-engaging position while the said slide is moving the work, and movable cams for separating the said arms while the said slide is being retracted, the said cams being engaged and thrust aside by said arms while moving the said blanks, and being thereafter restored to their operative position to engage and support said arms during their return stroke.

16. A machine for making nuts comprising a plurality of dies, means for pushing blanks from one of the said dies to another, the said pushing means comprising a slide, a pair of work-engaging arms pivotally secured to the said slide, a spring for holding the said arms in work-engaging position while the said slide is being moved to carry work from one die to the next, spring pressed cams for causing said arms to diverge while the said slide is being retracted and pins carried by said arms for engaging said cams.

17. A machine for making nuts comprising a bed, a plurality of dies carried by said bed, means for delivering blanks to said bed, and means for transferring said blanks successively to the said dies, the said transferring means comprising two sliding arms, each having a plurality of work-engaging members, pins carried by said arms, cams pivotally mounted adjacent to the path of movement of the said pins, the said cams being spring-pressed into the path of said pins and being deflected by said pins when the said arms advance and engaging said pins to separate said arms on their reverse movement.

18. A machine for making nuts comprising a bed, a roughing die and a crowning die carried by said bed, and means for transferring blanks from the said roughing die to the said crowning die.

19. A machine for making nuts comprising a bed, a plurality of dies carried horizontally side by side on said bed, and a chute for receiving blanks from one of the said dies and for transferring the said blanks back to the same bed adjacent to another of said dies.

20. A machine for making nuts comprisinging a vertically reciprocable punch head, a piercing punch, a forming punch, a crowning punch and a finishing punch, all carried by the said head, a bed disposed beneath the said punches, cutting, roughing and trimming dies disposed beneath said forming punch, a chute for receiving blanks from the said trimming die and for transferring said blanks back to the said bed, and means for transferring the blanks from the said chute to the said crowning die and thence to the said finishing die.

In testimony whereof, I, the said ANDREW WOLFRAM, have hereunto set my hand.

ANDREW WOLFRAM.

Witnesses:
ROBT. D. TOTTEN,
JOHN F. WILL.